(12) United States Patent
Pihola et al.

(10) Patent No.: US 7,582,189 B2
(45) Date of Patent: Sep. 1, 2009

(54) METHOD FOR OPTIMIZING PRODUCTION OF PAPER OR BOARD

(75) Inventors: Pekka Pihola, Vantaa (FI); Heikki Kettunen, Espoo (FI); Lari Lahdensuu, Vantaa (FI)

(73) Assignee: Metso Paper, Inc., Helsinki (FI)

( * ) Notice: Subject to any disclaimer, the term of this patent is extended or adjusted under 35 U.S.C. 154(b) by 416 days.

(21) Appl. No.: 10/572,296

(22) PCT Filed: Sep. 15, 2004

(86) PCT No.: PCT/FI2004/000539

§ 371 (c)(1),
(2), (4) Date: Mar. 14, 2006

(87) PCT Pub. No.: WO2005/026855

PCT Pub. Date: Mar. 24, 2005

(65) Prior Publication Data

US 2007/0095494 A1   May 3, 2007

(30) Foreign Application Priority Data

Sep. 15, 2003  (FI) .................................. 20031317

(51) Int. Cl.
*D21F 11/00* (2006.01)
(52) U.S. Cl. ........................ 162/198; 162/263; 162/252; 162/258; 700/127; 700/128

(58) Field of Classification Search ................. 162/198, 162/263, 252, 258; 700/127, 128
See application file for complete search history.

(56) References Cited

U.S. PATENT DOCUMENTS

| 4,885,677 A | 12/1989 | Heilman et al. |
| 5,844,795 A | 12/1998 | Johnston et al. |
| 6,012,044 A | 1/2000 | Maggioncalda et al. |
| 6,319,362 B1 | 11/2001 | Huhtelin et al. |

FOREIGN PATENT DOCUMENTS

| EP | 1 184 765 A2 | 3/2002 |
| WO | WO 01/03031 A1 | 1/2001 |

*Primary Examiner*—Mark Halpern
(74) *Attorney, Agent, or Firm*—Cohen Pontani Lieberman & Pavane LLP

(57) ABSTRACT

The invention relates to a method in the manufacture of a fiber-based web-like product for optimizing the operation of the process being used, in which method quality factors are defined for the product being manufactured control variables, which affect the state of the process, or quality factors of the finished product, are defined for at least part of the process. In addition, an operating model is created, which is used to depict the effect of each control variable on the quality factors, and a user interface is created, through which varying values for the control variables can be input to the operating model and the values of the quality factors can be depicted simultaneously, in such a way that the values of the control variables and the values of the quality factors can be viewed simultaneously.

10 Claims, 1 Drawing Sheet

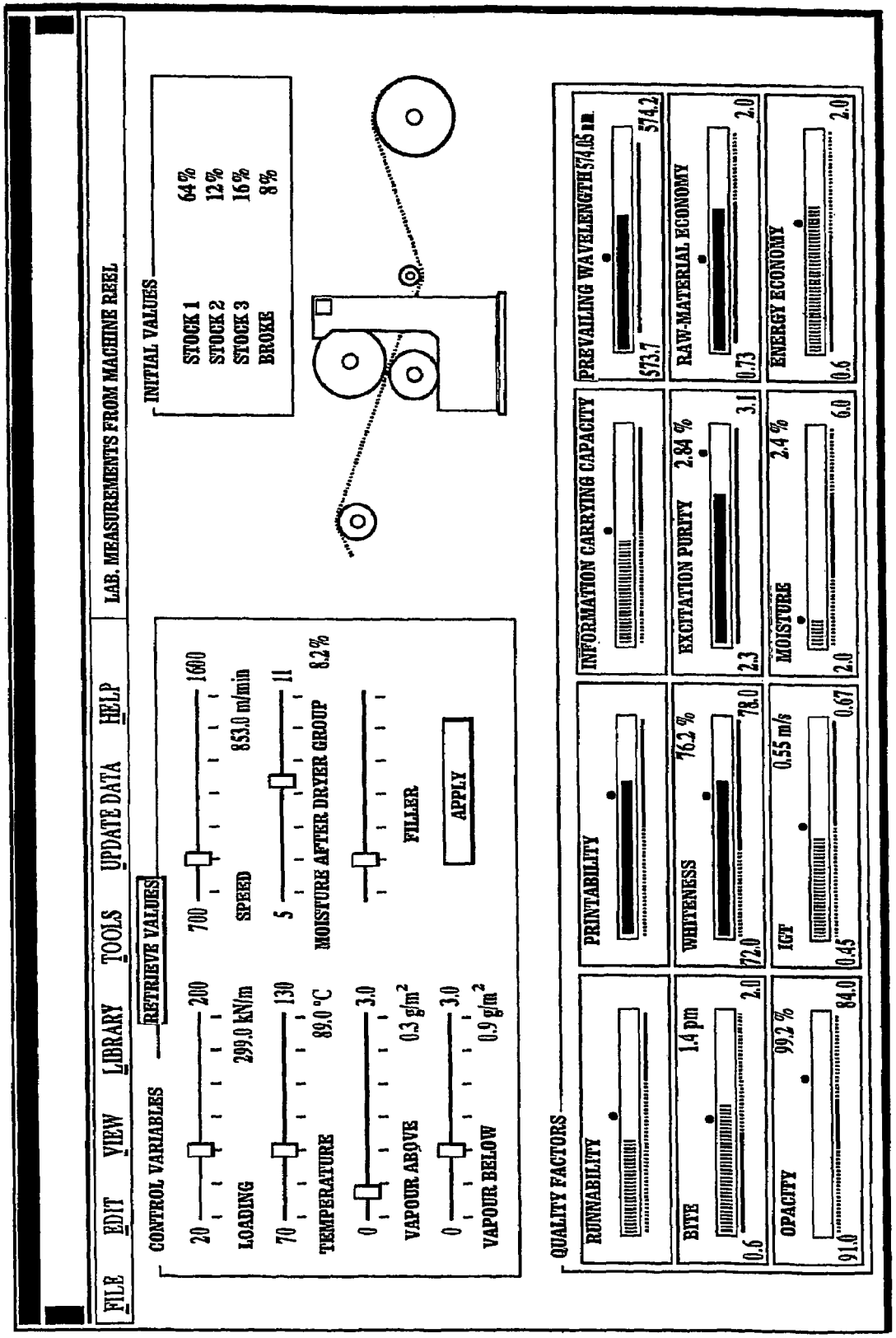

METHOD FOR OPTIMIZING PRODUCTION OF PAPER OR BOARD

PRIORITY CLAIM

This is a national stage of PCT application No. PCT/FI2004/000539, filed on Sep. 15, 2004. Priority is claimed on Application No. 20031317, filed in Finland on Sep. 15, 2003.

BACKGROUND OF THE INVENTION.

The present invention relates to a method and a computer program product for optimizing the production of paper or board.

In this description, the term "paper" or "board" refers to web-like products, which are formed at least mainly from a stock refined from vegetable fibre. The most important products in the group are printing papers, packing boards, and tissue papers. In addition, various special products and combination products are manufactured, in which case artificial polymer films, metal foils, or fillers can be added to the fibre-stock web. For the sake of simplicity, only the manufacturing processes for printing papers will be examined in the following, but the principles of the invention can also be applied to the other products referred to above.

The manufacturing process begins with a fibre stock mixed with water being prepared and spread onto a wire. Spreading takes place using a head-box, which forms an even layer of stock on the wire. The raw materials used in manufacture, such as cellulose pulp, can be made in the same mill, or purchased from an external manufacturer. The properties of the stock depend on its manufacturing method and raw materials, mixtures of different raw materials being frequently used. The manufacture of paper or board uses, among other materials, mechanical fibre, cellulose pulp, recycled fibre, broke returned to the process, and a wide variety of chemicals, binders, and colouring agents. The properties of the fibre stock used greatly affect the properties and price of the paper. By using different stocks, the strength, brightness, and surface quality of the paper, for instance, can be influenced. When manufacturing a specific type of paper grade, an attempt is usually made to select a combination of the most economically priced raw materials that can be used to achieve the quality targets set by the customer. The price of the base paper is particularly strongly affected by the type of the stock, or the combination of stocks. As the prices of fibre pulps vary continuously, it is advantageous to alter the stocks according to the price variations, in order to achieve the best possible profit. If recycled stock is used, the selected stock composition may be affected by even the availability of recycled fibre. If enough recycled fibre is not available, it must be replaced with other pulp. Because the quality and properties of the base paper have a considerable effect on the following stages of the manufacturing process, it is difficult to optimize the manufacture of the base paper.

Though a great amount of water leaves the base paper stock on the wire, it must still be effectively dried. Drying takes place by pressing between felts and finally with the aid of heat, usually on dryer rolls. By regulating and dividing the drying event, the removal of water from the web in different stages can be used to affect the properties of the paper and particularly the amount of energy required. After drying, the paper may be complete, or it can be taken for further processing, either to devices that are a direct continuation of the paper machine, or to separate finishing devices. When manufacturing printing papers, the devices used for finishing are usually calenders for improving the smoothness of the paper, and various coaters for applying different substances to the surface of the paper. Usually pigment coatings, such as kaolin and calcium carbonate, are used. There is a great number of different coating agents and combining them permits a nearly unlimited number of different coating mixtures to be created. In addition to the above methods, paper is treated with surface size to increase its strength and with various additives, which are added, for example, to the pulp.

All the manufacturing stages referred to above affect the properties of the paper that is created as the end product. For example, if a darker pulp is used, a greater amount of coating will be required to achieve the same surface whiteness. Similarly, if a more expensive long-fibre stock is used, a greater proportion of the stock can be replaced with a filler, so that the amount of stock can be reduced. In both of the above cases, the most economical mix ratio is determined by the purchase price of the production goods, while the boundary values of the available range of variation are determined according to the desired properties of the final product. Thus, the limits within which a final product meeting the quality requirements can be manufactured also limit the variations in the amounts and proportions of the raw materials. Besides energy and raw materials, the production factors relating to the costs of the product include tangible and intangible capital, personnel resources, and various services, such as transport, maintenance, cleaning, marketing, security, and the purchasing of external expertise. The production factors must be either purchased from outside the company, or produced within it.

If only two variables are examined, as above, a change in the process and its effects can be easily understood. If it is considered that each change made in the process will have many different effects on the properties of the paper, the costs of manufacture, the runnability of the machine, and the amounts of raw materials required in manufacture, it will become obvious that the effect of even a single change is difficult to assess. The management of the process is made even more difficult by the fact that individual process changes must be compensated by correspondingly altering other process factors. Thus, it is easy to become involved in a chain of changes that is difficult to predict.

In paper machines, highly developed control system are used, which monitor the quality and properties of the product being manufactured. However, these control systems usually control only a single variable property, such as the moisture content of the paper in different stages of manufacture, or the thickness or thickness profile of the paper. Thus, for example, a change in moisture content in an early process stage will affect the quality of the base paper in terms of whether the paper requires wetting or drying prior to calendering in a later process stage. Usually, there are still wetting and drying devices at the calender, by means of which the moisture content of the paper is suitably adjusted for calendering. In addition, the calender has its own moisture control system. This system is intended to keep the moisture within the set limits, but is in no way able to take into account, for example, wetting or drying requirements arising from changes in the fibre quality. Correspondingly, the other control processes operate relatively independently and attempt to keep the variable they control within the set limits. Thus, the control system cannot react, for example, to adjustment requirements arising from changes in raw materials, except in the case of its own variable. Due to this, in a state of change, the machine operator must set the necessary running values in the control system, after which the control must usually be fine tuned to achieve the final properties of the product. This control setting is based on previous production data, with the aid of the experientially based know-how of the machine operators.

In the paper manufacturing process and its sub-processes, such as the manufacture of the base paper, the operator must control several management variables. These include speed, temperature, the linear load in the calender, wetting, the coating amount and mix, the drying effect and its distribution through the different drying stages, the raw materials and their proportions, and so on. In addition to these, the prices of energy and raw materials, which change continuously, must also be taken into account. The choices made by the operator concerning these variables affect, in a manner that is, however, generally predictable through theory and experience, the various properties of the product being manufactured, as well as its price.

A paper maker's objective is to manufacture as cost-effectively as possible paper that meets the customer's quality requirements. For this purpose, measurement methods have been developed, which are intended to be used to predict the behaviour of the paper in a printing press and as an end product. Correspondingly, measurement methods for the properties of other products have also been developed. Information on many properties that affect the quality of paper are obtained already on the paper machine, with the aid of online measurements. In addition, traditional laboratory measurements and monitoring is used, along with the possibility to use automated paper testing laboratories. These data can be processed and transferred in an electronic form.

From the point of view of the user of printing paper, the most important aspect is the final result of the printing. The printing result is affected by the runnability of the paper, i.e. the number of printed products produced in a unit of time, a high running speed, printability, i.e. the amount of ink required to achieve the quality characteristics, and the information carrying capacity, which consists of the darkness of the impression, the capacity to reproduce details, and the unevenness of the impression. A manufacturer of printed products must also take into account the price of printing, which is strongly affected by the paper. The higher the desired quality of the impression, the more highly processed and expensive the paper that must be used, thus raising costs. It is therefore most economical for the paper buyer to purchase the cheapest paper that meets the quality requirements.

The control variables of the manufacturing process often affect in an individual manner nearly all the properties being measured. The criteria set for the properties of the product can be met using several different combinations of the control variables. The search for the best values, and often for those optimized other than directly in terms of the properties of the product (such as the amount of energy used in different forms), demands knowledge, experience, and time. The user interfaces of the measurement results depicting the properties of the product and of the control variables affecting the process do not meet the requirements related to making such examinations. Usually, the information is dispersed very widely over different systems and it is laborious to gain an overall picture. For example, forming a real-time picture of the runnability, printability, and information carrying capacity of the paper being made on a paper machine is impossible, as is the real-time control of the paper machine on the basis of these properties.

In principle, multi-variable control implemented in the correct manner could form a tool for improving manufacture, but it is neither economically nor technically feasible to implement such a system with the aid of the present level of technology. A second weakness relating to control systems is that the control always functions according to a control strategy built into the control system. This control strategy is always based on models that have previously been shown to be good, in which limits are set, within which the control must remain. Thus, it may not necessarily be possible to find optimal values for complex systems, if, for example, the adjustment range of some variable must be exceeded, but the exceeding can be compensated for with the aid of other control variables.

SUMMARY OF THE INVENTION.

The present invention is intended to create a method, with the aid of which it is possible to optimize the paper making process in its entirety, its sub-areas, or some factors affecting the process and the final result.

The invention is particularly intended to combine the process control with financial control, i.e. the control of the paper making machine is combined with the financial control in such a way that the machine can be controlled economically.

The invention is based on creating a simulator model for at least part of a production line used for manufacturing a vegetable-fibre-based, web-like product, which model includes an interface for the input of the control variables relating to the production process and proposals for changing the control variables, a calculation model for calculating the quality factors relating to the process, and elements for displaying the control variables and calculated quality factors simultaneously.

The invention is directed to a method, in the manufacture of a fibre-based web-like product, for optimizing the operation of the production line process being used, in which quality factors are defined for the product being manufactured and control variables, which affect the state of the process, or quality factors of the finished product, are defined for at least part of the process. An operating model is created, which is used to depict the effect of each control variable on the quality factors. A user interface is used, through which varying values for the control variables can be input to the operating model and the values of the quality factors can be depicted simultaneously in such a way that the values of the control variables and the values of the quality factors can be viewed simultaneously. A number of steps are iteratively performed. The quality factors from the production line process are received. A particular production line process or machine section from which the quality factors are obtained is displayed on the user interface. The operating model for the displayed production line process or machine section is selected. The control variables for that production line process or machine section are displayed on the user interface. Optimum or target values of the quality factors are displayed on the user interface. Adjustments of the control variables are received through the user interface which will adjust the quality factors.

Considerable advantages are gained with the aid of the invention.

The method in intended to accelerate and facilitate the optimization of the manufacturing process. The objective can be either to optimize the quality of the product within the limit of some production factors, or to keep the quality of the product within predefined values while keeping the manufacturing costs of the product as low as possible. However, the intention is usually to bring several factors within an optimal range, so that the overall result is as good as possible. The objective of the optimization can also be regarded as being a multi-dimensional area. The method is particularly advantageous when the quality of the paper being manufactured is being changed, because at that time the method can be used to predict the future situation and to permit a start from process control values that are close to the final values that will be used for production. Even though the paper grade may have been manufactured already earlier, the process conditions and the raw materials will, however, probably have changed slightly from those used previously. With the aid of the invention, it is possible to predict in what way the control variables must be changed, in order to take the change in the initial situation into account. Similarly, changes may take place during the process. With the aid of the invention, it is possible to be ready for these changes and predict the need for adjustments, or other changes required in the process.

Because the idea of the invention is to display the control variables and the quality factors simultaneously, for example, on a computer display, the operator receives an immediate overall picture of the development of the situation. At the same time, it is possible to experiment with what control variables and production factors it would be possible to manufacture, for instance, a paper tailored to the special requirements of a user. Further, possible changes in raw materials can be examined beforehand and thus avoid poorly selected raw-material purchases, for example, when the use of some cheap raw material would lead to a rise in the total costs. The model required to implement the method is separately tailored for each process and a product library and production logbook are preferably attached to it. These can be used to record the products made, the properties achieved in the end product, and the costs incurred. The model is continuously made more precise, so that its predictions become increasingly precise through use as the model is adapted to real conditions.

The invention can be implemented as software, which is used throughout an entire enterprise, so that, for instance, machine operators, production control, marketing, and management all see the same window. Thus they can simultaneously follow possible changes made to production and thus assess their advantageousness. Several different windows can advantageously be set up, for example, in such a way that general operating views showing the overall situation can be available to all users while special windows are tailored for separate groups of users, and are only available for the group in question. Thus, for example, specific windows can be implemented for production, machine operators, production control, and financial management, with the aid of which they can simulate the situation in their own area. In principle, all necessary information is presented to each user group, but all unnecessary information is eliminated. With the aid of the system, it is also possible to review production that has already taken place and determine how the real control situation has affected product quality and the manufacturing process.

There can be different windows, in one it may be possible to follow, for example, energy consumption, the production costs incurred, raw materials consumption, or the product's quality factors. Naturally, these can all be shown simultaneously. However, it should be remembered that too much information to be digested should not be shown in a single window, for reasons of clarity. Similarly, there can be several sub-models beneath the model of the entire production process, each with its own window. Thus, for example, the operation of the drying section, the calender, or the coating station can be examined separately form the total model. Naturally, the invention can also be applied to an individual production device, if several control variables are required to control it.

With the aid of the invention, the functionality of even irrational process situations can be experimented with, for example, by setting the control variables to such values at which the control-value limits or the product's quality-factor limits are exceeded. This makes it possible to experiment to determine whether some unconventional running procedure would achieve products according to the targets, or whether emphasizing some quality factor would create new products. According to the traditional manner of production, it might, for example, be irrational to use more expensive production goods, in a situation in which enough cheaper ones are not available. Similar reasons might be reasons arising from business policy, i.e. it is preferred to purchase production goods from the group's own mills, or there may be numerous reasons arising from competition policy, or from the values of the owners or society. Further, if a batch of raw material is approaching an age at which it will become unusable, there may be grounds for using it, even though a cheaper raw material of sufficient quality may be available.

With the aid of the invention, it is possible to examine the consequences of multi-variable control from a financial point of view and also combine them with changes in the quality of the end product.

BRIEF DESCRIPTION OF THE DRAWINGS

In the following, the invention is examined with the aid of the accompanying drawing.

FIG. 1 shows one embodiment of a window in the method according to the invention.

DETAILED DESCRIPTION OF THE PRESENTLY PREFERRED EMBODIMENTS

In the following, the term "control variables" refers to process factors, which can be adjusted or altered and, with their aid, the state of the process and the quality of the product can be influenced. The term "quality factors" refers to the properties of the product, either during the process, or in the end product. Control variables are, for example, speed, drying effect, raw materials and their properties, moisture content, the amount of coating or size, the load on a doctor blade, and the loading and temperature of the calender. Examples of the quality factors of the product include bulk, stiffness, grammage, gloss, bite, opacity, whiteness, and surface strength. When the invention is applied, the calculation model used is prepared for a specific machine, so that, when making uncoated and uncalendered paper, only the control variables and quality factors that relate to the actual paper machine are taken into account. When making coated and calendered paper on an on-line machine, the number of factors and variables will naturally be greater and the model required more complex. Correspondingly, an individual optimization method can be tailored for independent off-line stations and calenders, in which the variables include the properties of the base paper produced by the machine.

The basic idea of the invention is to apply the optimization model separately to each machine being used, so that it can be used to predict the events of precisely a specific process. The operation of the machine or process component is depicted mathematically, in such a way that the values of the quality variables are obtained to depict the control variables. In the model, the quality variables are the varying values input to the model, on the basis of which the values of the quality variables are calculated in real time. The quality variables are preferably shown on the display as relative values, for example, graphically. The model is primarily intended, not to predict absolute changes in the quality factors, but to show the relative changes, particularly the direction or directions of the changes in quality and other factors that will probably be caused by the intended change. Thus, the intention is to apply the method to be able to tell whether a change in an individual or several variables will have an effect in the desired direction.

The control variables are shown in the same window as the quality factors, so that when a single control variable is altered, the changes in all of the quality factors can be seen immediately. If the quality factors do not now remain within the set limits, the other quality factors can be altered to compensate for the first change. The real control situation when production factors change is simulated in this way with the aid of the method. In actual production, it is extremely difficult to experiment with changes, because the changes take place slowly and it is not possible to see what the overall effect of the changes is. It is also so expensive to use a production machine for purposes other than actual production that no changes other than essential control measures can be made, for example, in order to change the grade being produced.

Once a basic model of the production equipment has been produced, it can be updated with real process data and the values of the corresponding quality factors. The updating can be performed at regular intervals from the control system and quality control of the production equipment, or monitoring can be continuous and the essential data recorded. The aim is to create a product library, which contains the data on previously produced product batches, so that with their aid it will be possible to change the product rapidly, without using a long time to run down the machine. With the aid of the invention, it is possible to prepare well beforehand for a product change, by experimenting how the available raw materials will affect the end product. In the same way, it is possible to experiment how a possible control change would affect the end product, the price of the product, or, for instance, the consumption of energy and other production goods.

The model needed to calculate the quality factors is formed, for example, by defining for each control variable the quality factors that it affects and defining a suitable effect coefficient. This will create a matrix, in which there is a calculation formula for each quality factor, which is used to determine its value on the basis of the control variables. Now each change in value of a control variable will appear as a change in several quality factors while correspondingly a single quality factor can be influenced with the aid of several control factors. There are several ways to create such a model and the actual creation of the model does not come within the scope of the invention. However, in terms of the invention, it is essential that the model is updated according to real and implemented running situations, by altering the effect coefficients of the control factors. In this way, during operation, the model can be adapted ever more precisely to the process being optimized.

One highly essential feature of the invention is how the values of the control variables and quality factors are presented. The control variables being dealt with at any time are shown in the same user interface as the values of the quality factors, so that when the value of a control factor is changed, the effect of the change can be seen immediately. In this case, the term user interface refers to an arrangement that is formed between the user and the system, i.e. a way to transfer data between the user and the system. The user interface can include various display devices, control desks, keyboards, and other means for inputting and presenting information. The control room of a modern paper mill can have 2-20 CRT or flat displays, on each of which several windows can be opened for different requirements.

Limit values are set for each control variable and quality factor, within which it must remain. In the case of the quality factors, these are defined on the basis of the properties required in the product and, in the case of the control variables, according to the available adjustment ranges. A graphical user interface is preferably used in the display, in which the values of the control variables can be changed directly in the display and the values of them and of the quality factors are shown as relative values in a suitable manner, for example, as columns, bars, pies, or similar. A graphical relative display is usually sufficient to assess how a change in some control factors will affect the process. What is essential is to achieve a better and more comprehensive predictability of the effects of changes in the control variables as a basis for changes to be made in production. It is not necessary to know the exact effect of a change in an individual control variable, such as the temperature of the thermo roll of a calender, on some quality factor, such as gloss. The invention is intended to show the user graphically whether the intended change will affect in the desired direction, or alternatively to assist the user to determine what changes to use to achieve a change in a desired direction. It is particularly important to determine what the total effects a change will have. Of course, windows or dimensioned numerical values to be selected for the display can be continuously added to the display.

The invention is intended to create an automation program to be used as part of the control system of the machine, or a separate program in the automation system, by means of which the end result of the process can be simulated for the user, on the basis of process models. The exploitation of the invention will be substantially facilitated, if the operation of the simulator is complemented with inversely acting optimization. The process models used at the basis of the simulation can be exploited with the aid of mathematical optimization algorithms, in such a way that the user or the automation system provides the intended final properties and the mathematical algorithm calculates the settings values for the machine, by means of which the target property totalities will be achieved as closely as possible. The optimization can also calculate the change of direction of the machine's settings values instead of the absolute levels. An essential feature of the optimization is that the deviation of the final parameter from the target leads to a cost factor. The optimization algorithm seeks a minimum of the combination of the costs of different parameters and the different costs can be mutually weighted. The weightings and cost factors are preferably such that the user can alter them.

FIG. 1 shows one possible way to present the display. The window of the display shown depicts the control variables and quality factors with the aid of a model simulating the operation of a calender.

In the upper right-hand corner of FIG. 1, a block can be seen, which shows the control variables being dealt with, loading, temperature, moisture content, amount of vapour above the web, filler, and the amount of vapour below the web. For each control variable there is a scale, the indicator on which can be moved to alter the value of the variable. In this window, there are also the numerical values of the variables given in units suitable for the variable. At the right-hand side of the control-variable block, there is an initial-value block, which shows the composition of the raw-material stock of the paper as percentages of the different types of stock being used. Beneath the initial-value block, there is a diagram of the device being used, in this case the nip in a calender.

At the bottom of the window is a quality-factor block. This block depicts 12 quality factors, with the aid of which the properties of the finished paper can be evaluated. The quality factors are shown as bar diagrams, at the lower edge of which there is an indicator with two or more parts, which is used to indicate the quality factors that are correct in terms of the end product and an area, by means of which the desired end result will be achieved. Above this indicator, there is a cursor, the values shown by which depict the values of the quality factors dependent on the control variables calculated with the aid of the simulator model. Here it should be noted that the quality factors do not necessarily depend only on the control variables shown in the window in question, but that the simulator can use many other data, which are obtained, for instance, from the machine's control and quality systems.

The invention is preferably implemented as a computer program. The program includes interfaces with the production process and quality-monitoring systems, of which those at the moment are listed first of all:

measurement data (process)
control data
measurement data (quality)
external factors (e.g., prices, raw-material availability)
other necessary data.

In other words, first of all the initial state of the change in the simulation is defined, i.e. the state in which the operation takes place. Next, one or more control variables are changed in the window of the simulator, after which the simulator presents the changes that will probably be caused to the quality and other factors being investigated. If, as a result of the simulation, changes in the correct direction are obtained, corresponding control changes can be made to the control system. Next, the simulator program can be updated with the new measurement and other data and possible new change situations can be assessed.

What is claimed is:

1. A method in a manufacture of a fibre-based web product for optimizing operation of a production line process being used, the method comprising:
   defining quality factors for the product being manufactured;
   defining, for at least part of the production line process, control variables which affect a state of the production line process or quality factors of the product;
   creating an operating model depicting the effect of each control variable on the quality factors;
   receiving values of the quality factors from the production line process;
   displaying on a user interface an identification of the production line process from which the quality factors are received;
   displaying on the user interface the control variables and the values thereof for the production line process from which the quality factors are received;
   displaying on the user interface the quality factors and the values thereof;
   applying the operating model for the production line process from which the quality factors are received;
   displaying on the user interface optimum values of the quality factors for the production line process from which the quality factors are received;
   receiving through the user interface adjustments of the control variables; and
   controlling the control variables of the production line process in response to the adjustments received through the user interface.

2. The method of claim 1, further comprising displaying on the user interface a direction of the effect of a change in the quality factors caused by adjustments of the control variables.

3. The method of claim 1, further comprising monitoring operation of the production line process and an actual effect of the control variables on the quality factors and altering the operating model to correspond to the production line process on the basis of the monitoring.

4. The method of claim 1, further comprising forming a product library, in which, with the aid of the production line process, the products being manufactured are depicted with the aid of quality factors and the corresponding control variables.

5. The method of claim 1, wherein the user interface comprises a display terminal, and the control variables and quality factors are shown on a the display terminal on a same display page.

6. The method of claim 1, wherein the user interface comprises a display terminal having several separate windows displaying a selected series of the control variables and quality factors at any one time.

7. The method of claim 1, wherein the user interface comprises a display terminal having several separate windows displaying a selected series of the control variables and quality factors at any one time.

8. The method of claim 1, further comprising displaying on the user interface adjustments in the control variables for changing the quality factors in a desired direction.

9. The method of claim 1, wherein the user interface comprises a display terminal, and the control variables and quality factors are shown on the display terminal on the same display page in a graphical form.

10. The method of claim 1, wherein the user interface comprises a display terminal having several separate windows displaying a selected series of the control variables and quality factors at any one time, the selected series of the control variables and quality factors relating to a sub-apparatus of the production line process.

* * * * *